United States Patent
Ma et al.

(10) Patent No.: US 11,150,990 B2
(45) Date of Patent: Oct. 19, 2021

(54) METHOD, APPARATUS AND COMPUTER READABLE MEDIUM FOR MANAGING A PLURALITY OF DISKS

(71) Applicant: EMC IP Holding Company LLC, Hopkinton, MA (US)

(72) Inventors: Charles Ma, Beijing (CN); Jian Gao, Beijing (CN); Xinlei Xu, Beijing (CN); Qingyun Liu, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 16/172,005

(22) Filed: Oct. 26, 2018

(65) Prior Publication Data

US 2019/0129797 A1    May 2, 2019

(30) Foreign Application Priority Data

Oct. 27, 2017    (CN) .......................... 201711031273.2

(51) Int. Cl.
*G06F 11/10*    (2006.01)
*G06F 3/06*    (2006.01)
(Continued)

(52) U.S. Cl.
CPC .......... *G06F 11/1092* (2013.01); *G06F 3/061* (2013.01); *G06F 3/0634* (2013.01); *G06F 3/0644* (2013.01); *G06F 3/0647* (2013.01); *G06F 3/0649* (2013.01); *G06F 3/0689* (2013.01); *G06F 11/1076* (2013.01); *G06F 11/3433* (2013.01); *G06F 12/0246* (2013.01); *G06F 2201/81* (2013.01); *G06F 2211/1028* (2013.01); *G06F 2212/7208* (2013.01); *G06F 2212/7211* (2013.01)

(58) Field of Classification Search
CPC ...... G06F 3/061; G06F 3/0634; G06F 3/0644; G06F 3/0647; G06F 3/0649; G06F 3/0689; G06F 11/1076; G06F 11/1092; G06F 11/3433; G06F 12/0246; G06F 2201/81; G06F 2211/1028; G06F 2212/7208; G06F 2212/7211
See application file for complete search history.

(56) References Cited

U.S. PATENT DOCUMENTS 5,960,169 A * 9/1999 Styczinski .......... G06F 11/1076
                                                       711/114
6,728,831 B1 * 4/2004 Bridge .................. G06F 3/0608
                                                       711/112

(Continued)

*Primary Examiner* — Eric T Oberly
(74) *Attorney, Agent, or Firm* — BainwoodHuang

(57) ABSTRACT

Embodiments of the present disclosure provide a method, apparatus and computer readable medium for managing a plurality of disks. The method includes in response to receiving a write request for a first stripe of a redundant array of independent disks (RAID), searching for extents mapped to the first stripe. The RAID is created on a plurality of extents obtained by dividing a plurality of disks. The method further includes, in response to the extents mapped to the first stripe being missed, selecting a first set of extents in a free state from the plurality of extents of the plurality of disks. The method further includes mapping the first stripe to the first set of extents.

19 Claims, 8 Drawing Sheets

(51) Int. Cl.
  *G06F 11/34*    (2006.01)
  *G06F 12/02*    (2006.01)

(56) References Cited

U.S. PATENT DOCUMENTS

| | | | |
|---|---|---|---|
| 7,631,155 B1* | 12/2009 | Bono | G06F 3/0608 |
| | | | 711/156 |
| 9,417,822 B1* | 8/2016 | Ballance | G06F 3/0689 |
| 9,529,546 B2* | 12/2016 | Sundaram | G06F 3/0641 |
| 9,594,770 B1 | 3/2017 | Kushmerick et al. | |
| 9,612,754 B1 | 4/2017 | Delgado et al. | |
| 9,703,498 B1 | 7/2017 | Armangau et al. | |
| 9,755,986 B1 | 9/2017 | Brown et al. | |
| 9,779,023 B1 | 10/2017 | Armangau et al. | |
| 9,804,939 B1 | 10/2017 | Bono et al. | |
| 10,430,279 B1* | 10/2019 | Dittia | G06F 11/1076 |
| 2003/0120863 A1* | 6/2003 | Lee | G06F 11/1084 |
| | | | 711/114 |
| 2012/0284587 A1* | 11/2012 | Yu | G06F 3/0631 |
| | | | 714/773 |
| 2013/0046950 A1* | 2/2013 | Coronado | G06F 3/061 |
| | | | 711/170 |
| 2013/0346794 A1* | 12/2013 | Bartlett | G06F 11/2094 |
| | | | 714/6.21 |
| 2014/0281123 A1* | 9/2014 | Weber | G06F 12/0246 |
| | | | 711/103 |
| 2015/0019807 A1* | 1/2015 | Malkin | G06F 3/0689 |
| | | | 711/114 |
| 2015/0347232 A1* | 12/2015 | Floeder | G06F 11/004 |
| | | | 714/6.23 |
| 2016/0357743 A1* | 12/2016 | Swaminathan | G06F 16/2255 |
| 2017/0060472 A1* | 3/2017 | Zhuang | G06F 3/0689 |
| 2017/0075781 A1* | 3/2017 | Bennett, Jr. | G06F 3/0619 |

* cited by examiner

METHOD, APPARATUS AND COMPUTER READABLE MEDIUM FOR MANAGING A PLURALITY OF DISKS

RELATED APPLICATIONS

This application claim priority from Chinese Patent Application Number CN 201711031273.2, filed on Oct. 27, 2017 at the State Intellectual Property Office, China, titled "METHOD, APPARATUS, AND COMPUTER-READABLE MEDIUM FOR MANAGING DISKS" the contents of which is herein incorporated by reference in its entirety.

FIELD

Embodiments of the present disclosure generally relate to the field of data storage, and more specifically, to a method, apparatus and computer readable medium for managing a plurality of disks.

BACKGROUND

Redundant array of independent disks (RAID) is a technology for data storage virtualization. With this virtualization technology, one or more RAIDs may be created on a plurality of physical storage disks to provide features such as data redundancy, performance improvement, and the like. RAID performs data writing and reading in units of stripe. Some traditional RAIDs write data evenly at the level of disks. Specifically, in data writing, data on each stripe of the RAID are written evenly into the plurality of disks on which this system is created such that the overall data of this RAID are distributed on the disks in an even manner. There may be defects for such system in aspects of disk management and data read/write.

With the development of RAID technology, a new RAID technology has been proposed. This RAID performs data read/write at a level of disk extents rather than disks. With this technology, a plurality of disks are divided into a plurality of extents. Each stripe of the RAID created based on these disks is allocated with a number of extents, with the extents included by all the stripes of RAID distributed substantially evenly on the plurality of disks. Such RAID may also be referred to as a mapped RAID or a distributed RAID. By creating RAID in the unit of disk extents, it is possible to achieve more flexible disk management and improvement of operating performance of the system.

However, although the RAID technology is developed continuously, there is still a need for more optimized solutions for disk management in RAID.

SUMMARY

Embodiments of the present disclosure provide an improved solution for managing a plurality of disks.

In a first aspect of the present disclosure, there is provided a method of managing a plurality of disks. The method includes in response to receiving a write request for a first stripe of a redundant array of independent disks (RAID), searching for extents mapped to the first stripe. The RAID is created on a plurality of extents obtained by dividing a plurality of disks. The method further includes in response to the extents mapped to the first stripe being missed, selecting a first set of extents in a free state from the plurality of extents of the plurality of disks. The method further includes mapping the first stripe to the first set of extents.

In a second aspect of the present disclosure, there is provided an apparatus for managing a plurality of disks. The apparatus includes a processor and a memory coupled to the processor, the memory having instructions stored therein which, when executed by the processor, cause the apparatus to perform acts. The acts include in response to receiving a write request for a first stripe of a redundant array of independent disks (RAID), searching for extents mapped to the first stripe. The RAID is created on a plurality of extents obtained by dividing the plurality of disks. The acts further include in response to the extents mapped to the first stripe being missed, selecting a first set of extents in a free state from the plurality of extents of the plurality of disks. The acts further include mapping the first stripe to the first set of extents.

In a third aspect of the present disclosure, there is provided a computer readable medium having computer readable instructions stored thereon which, when executed, cause a device to perform the method according to the first aspect.

In a fourth aspect of the present disclosure, there is provided a computer program product being tangibly stored on a non-transient computer readable medium and comprising machine executable instructions. The machine executable instructions, when executed, cause a machined to perform the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same references usually represent the same components.

DETAILED DESCRIPTION OF EMBODIMENTS

Figure 1:
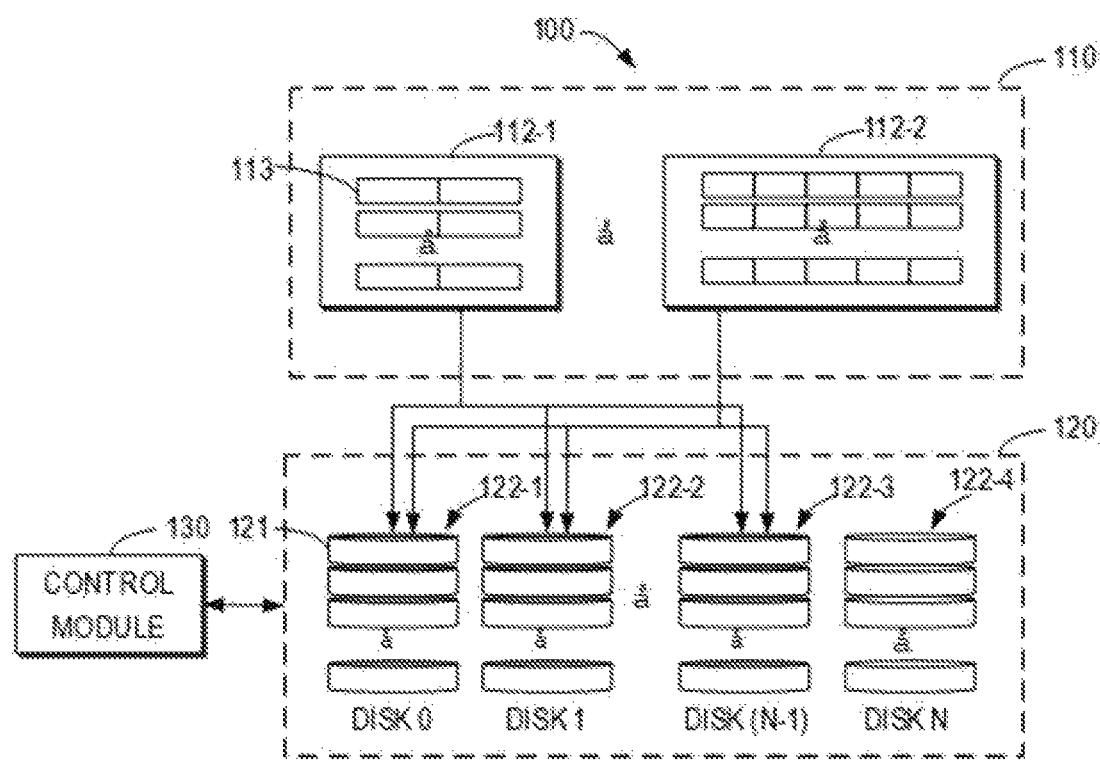
FIG. 1 illustrates a schematic diagram of a storage system in which embodiments of the present disclosure can be implemented.

Principles of the present disclosure will now be described with reference to several example embodiments illustrated in the drawings. Although preferred embodiments of the present disclosure are shown in the drawings, it would be appreciated that description of those embodiments is intended to only enable those skilled in the art to better understand and in turn implement the present disclosure and is not intended to limit the scope of the present disclosure in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an embodiment" are to be read as "at least one example embodiment." The term "another embodiment" is to be read as "at least another embodiment." The terms "first," "second," and the like can represent different or the same objects. Other definitions, either explicit or implicit, may be included below.

FIG. 1 is a schematic diagram illustrating a storage system 100 in which embodiments of the present disclosure can be implemented. The system 100 includes a redundant array of independent disks (RAID) virtualization layer 110 and a physical storage layer 120. The physical storage layer 120 includes a plurality of (such as N+1) physical disks 122-1, 122-2, . . . , 122-3, 122-4 for provisioning physical storage space. These disks may collectively or individually be referred to as disks 122, which may be any types of persistent disks, examples of which may include, but are not limited to, a digital versatile disk (DVD), a Blue-ray disk (BD), a compact disk (CD), a floppy disk, a hard disk, a tape drive, an optical drive, a solid state disk device (SSD) and so on. Other disks providing a storage space may also be adopted. Each disk 122 is divided into a plurality of extents 121 which may have the same storage capacity. Extents 121 may also be referred to as disk extensions, storage units and the like, and the layer 120 may also be referred to as a storage pool. In some cases, one or more new disks may be added to the layer 120 to expand the storage capacity.

The RAID virtualization layer 110 may include one or more RAIDs 112-1, 112-2, . . . . These RAIDs may collectively or individually be referred to as RAIDs 112. Each RAID 112 is created on a plurality of extents 121 obtained by dividing a plurality of disks 122 of the physical storage layer 120. Such RAID 112 is sometimes referred to as a mapped RAID or a distributed RAID. A RAID 112 may include a plurality of stripes 113, each of the stripes 113 being mapped to one or more extents 121 of the layer 120. The number of extents 121 included by each stripe 113 may indicate a width of the stripe, also referred to as a RAID width. When the user writes data to a certain stripe 113 in the RAID 112, the written data may be stored in the extents 121 that the stripe 113 is mapped to.

Depending on characteristics of redundancy, performance and so on, the RAIDs 112 may have different levels. RAIDs 112 of different levels will distribute data on extents 121 mapped to the stripes 113 in different manners. The levels of RAID may include, for example, RAID1, RAID2, . . . , RAID5. Taking RAID5 as an example of RAID 112, each stripe 113 includes five extents 121 with four of which may contain data and the other one may contain check information. The extent 121 containing check information may be used to restore data of the other extents 121 of the stripe 113. It would be appreciated that RAIDs of any other levels may be implemented in the storage system 100.

At the layer 120, one or more disks 122 (such as the disk 122-4) may be used as spare disks 122. During normal operations, the spare disk 122 is not used for providing the storage capacity of the RAIDs 112. In other words, the extents 121 of the spare disk 122 are not mapped to the stripes 113 of the RAIDs 112. If the number of errors occurred on any of the disks 122 being used is too large (for example, exceeding a predetermined threshold), the disk 122 is marked as an end of life (EOL) disk 122. The spare disk 122-4 may be enabled to replace EOL disk 122. The extent allocation of the enabled spare disk 122 will inherit the extent allocation of the EOL disk 122.

In addition to the spare disk, the layer 120 may further include spare extents 121. Some extents 121 in the available disks 122 of the layer 120 may be used as spare extents. During normal operations, such spare extents 121 will not be allocated to the RAIDs 112 as the storage capacity of RAID 112. When a certain used disk 122 is broken, the control module 130 will start an RAID rebuilding process. During this process, the control module 130 will rebuild data in the failed disk 122 and select the spare extents 121 for storing the rebuilt data. The stripe 113 to which the data addressed will be mapped to the selected spare extents 121.

Depending on the characteristics of the RAID technology, each RAID 112 is distributed evenly across a plurality of available disks 122; that is, each RAID 112 is allocated evenly with extents 121 of respective available disks 122 at the layer 120. In the example shown in FIG. 1, the disk 122-4 is a spare disk while the extents 121 of the remaining disks 122-1, 122-2, . . . , 122-3 may be mapped to the stripes 113 of the RAIDs 112-1, . . . , 112-2. For example, a stripe 113 of the RAID 112-1 is mapped to an extent 121 of the disk 122-1 and an extent 121 of the disk 122-2, another stripe 113 is mapped to an extent 121 of the disk 122-3 and an extent 121 of the disk 122-1, and the other stripes may also be mapped in a similar manner. The number of extents 121 to which the RAID 112-1 is mapped on each available disk 122 is substantially the same, which thereby achieves an even distribution across the plurality of disks.

The storage system 100 may further include the control module 130 to control the plurality of disks 122 at the layer 120. The control module 130 may be implemented by a device with processing capability, such as a processor, a controller, a microcontroller, or a computer comprising the above components. The control module 130 may respond to writing/read requests to the stripes 113 of the RAID layer 120 so as to read and/or write data from and/or to the corresponding extents 121. The operation involved in the reading and/or writing of data is referred to as an input/output (I/O) operation or an I/O path. The control module 130 may further perform various maintenance operations for the plurality of disks 122 to support the performance of data redundancy, reliability and the like for the storage system 100. The operation involved in the maintenance of the plurality of disks 122 is referred to as a backstage operation or a backstage path. The backstage operation for the extent reallocation in the control module 130 will be described below.

In some cases, when a new disk is added to the layer 120, the control module 130 will perform the extent reallocation operation. The control module 130 reallocates the extents for the new disk and the extents of the existing disks 122 at the layer 120 such that all the stripes 113 of the RAIDs 112 are evenly allocated with the extents of these disks. Therefore, some extents of the new disk will replace some extents in the existing disks 122 and be allocated to one or more stripes 113 of the RAIDs 112. This reallocation operation is also referred to as a shuffle operation. After the reallocation operation, the mapping related to one or more stripes 113 of the RAIDs 112 will be updated based on the reallocation result. In some other cases, when an existing available disk 122 is marked as an EOL disk, the control module 130 will select the spare disk 122 to replace the EOL disk 122. Since the extent distribution of the enabled spare disk 122 will inherit from the EOL disk 122, it will trigger updating of the mapping between the stripes 113 of the RAIDs 112 and the extents 121.

It would be appreciated that the devices and/or arrangement illustrated in FIG. 1 are illustrated as an example only. In other embodiments, the storage system 100 may include any suitable number of disks 122 and RAIDs built thereon. The created RAIDs may be of the same or different types. Depending on the architecture of the storage system, in some examples, there may be other logic layers over the RAID virtualization layer 110, such as a Flare logic unit number (LUN) layer, a mapped LUN layer and/or a Thin LUN layer, for processing read/write requests or other requests from the user.

In the conventional solution, when each RAID is created, the RAID will be allocated with the storage capacity that meets its requirement from a plurality of extents of the existing disks. For example, if the user wants to create a RAID with the capacity of 500 GB, then the extents that meet this capacity requirement are allocated from the disks and mapped to the stripes of the RAID (the selected extents may have a capacity that is equal to or larger than 500 GB). The allocated extents are filled with dummy data (such as all-zero values). When the user writes data to a certain stripe of the RAID, the data (referred to as valid data) will be written into the extents to which the stripe is mapped to replace the previously filled dummy data.

The extent allocation manner in the conventional solution has various disadvantages.

For example, during the extent reallocation triggered by adding a new disk, if a stripe of a RAID is determined to be remapped from the extents of the existing disks to the extents of the new disk, data on the extents of the existing disk will be migrated to the corresponding extents of the new disk. As mentioned above, when the extents allocated to the stripe of the RAID has not been written with valid data from the user, they are filed with dummy data (i.e., invalid data) in advance. If the extents store invalid data, such invalid data may also be migrated to the extents of the new disk. Similar migration of invalid data may also happen during the process of swapping an EOL disk; that is, invalid data on the EOL disk may be migrated to the currently enabled spare disk. The migration of invalid data will unnecessarily delay the extent reallocation. If the user initiates a read or write request during this process, it will take longer time to complete the extent reallocation.

In some other cases, the user adds one or more new disks to the storage layer to expand the storage capacity of the storage layer, and also expects to create a new RAID at the layer. If all the extents of the storage layer have been allocated to the existing RAIDs and the number of the newly added disks is smaller than the stripe width of the new RAID to be created, then the new RAID cannot be created until the extent reallocation triggered by the newly added disks is completed. This reduces the flexibility in creating the RAID and results in a longer delay.

According to embodiments of the present disclosure, there is provided an improved solution for managing a plurality of disks. The solution of the present disclosure provides on-demand extent allocation. After a RAID is created, when a stripe of the RAID is actually to be written with data, extents in a free state are selected from the extents of the plurality of disks and the stripe is mapped to the selected extents. Instead of allocating the mapped extents to all stripes of the RAID, the solution of the present disclosure can achieve more flexible disk allocation as well as improve the performance of disk management.

Figure 2:
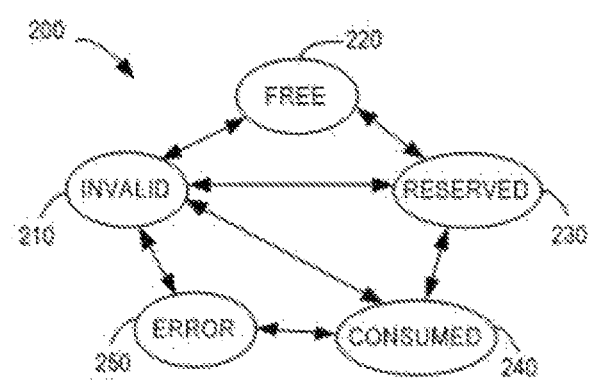
FIG. 2 illustrates a state transition diagram for extents of disks in accordance with an embodiment of the present disclosure.

Embodiments of the present disclosure will be described in detail with reference to the drawings. In the embodiments of the present disclosure, extents of a disk are identified with respective states. The extents in a free state may be selected to be mapped to the stripes of a RAID. Depending on the current condition, a state of an extent may be transitioned among the predefined states. FIG. 2 illustrates some example states for the extent and a transition diagram 200 among the states. The states for an extent may include an invalid state (I) 210, a free state (F) 220, a reserved state (R) 230, a consumed state (C) 240, and an error state (E) 250, which will be introduced below.

The invalid state 210 indicates that the corresponding extent does not exist, the disk in which the corresponding extent is located is unavailable, or the number of errors occurred on the extent is great (greater than a certain threshold). The extent identified as in an invalid state 210 is not available. For example, if a disk is removed, marked as failed, or in any unavailable state, all the extents of this disk are identified as in the invalid state.

The free state 220 indicates that the corresponding extent is available, but has not been allocated to any RAID. The extent in the free state 220 is not mapped to any stripe of a RAID. When a new storage pool is created and no RAID is created on the storage pool, the extents of all the disks of the storage pool may be in the free state 220.

The reserved state 230 indicates that the corresponding extent has been reserved for a certain RAID (for example, a certain stripe of the RAID), but the mapping between the extent and the corresponding stripe of the RAID has not been established. The reserved state 230 is a transit state between the free state 220 and a consumed state 240 discussed later.

The consumed state 240 indicates that the corresponding extent has been allocated to a certain RAID (for example, a certain stripe of the RAID) and the mapping between the extent and the corresponding stripe of the RAID has been established.

The error state 250 indicates that the corresponding extent has been consumed by a RAID but an error occurred on the extent when performing input/output (I/O). For example, when data is to be written/read to/from the extent in the consumed state 240, the writing/reading fails due to the error of the disk. In this case, the state of this extent will be changed to an error state.

FIG. 2 illustrates possible transition among the above states. It would be appreciated that these states and their transition are only an example. In the other embodiments, one or more states may be omitted or the transition from one state to the other state may be forbidden or added. The transition of the extent of the disk between these states will be described in more detail below.

Figure 3:
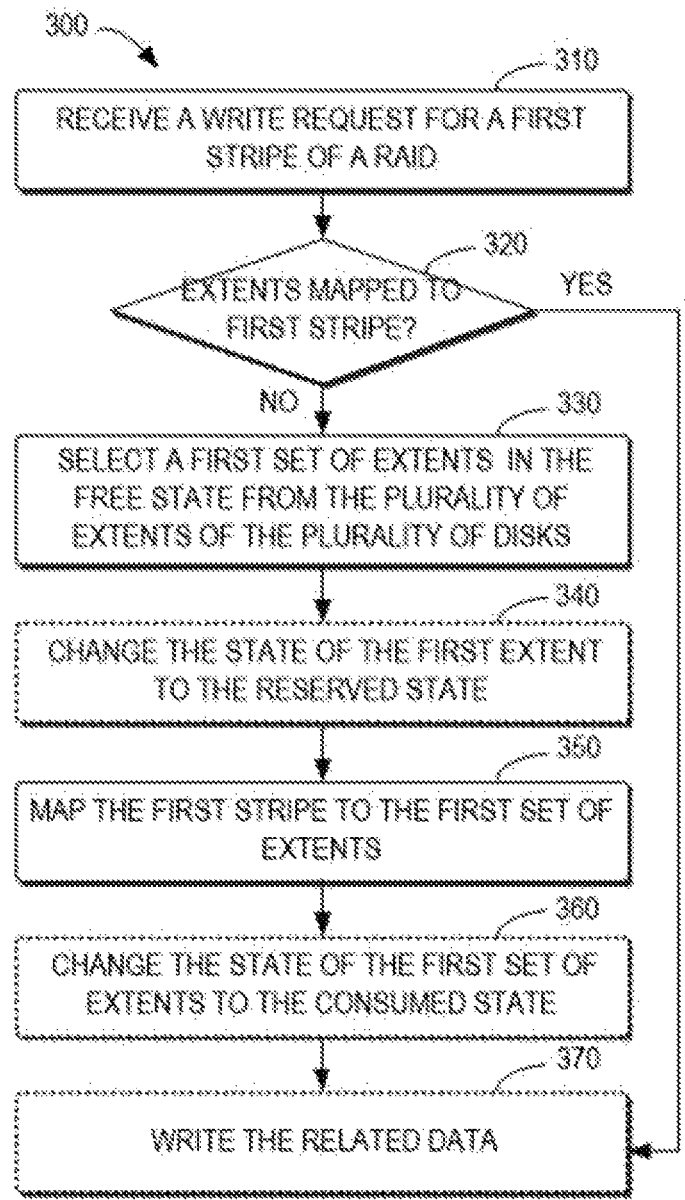
FIG. 3 illustrates a flowchart of a process of managing a plurality of disks in accordance with an embodiment of the present disclosure.

FIG. 3 is a flowchart illustrating a process 300 for managing a plurality of disks in accordance with an embodiment of the present disclosure. The process 300 may be implemented at the control module 130 illustrated in FIG. 1. For purpose of discussion, the process 300 will be described with reference to FIGS. 1 and 2.

At 310, the control module 130 receives a write request for a stripe 113 (hereinafter referred to as a "first stripe" 113) of a RAID 112. The write request may also be referred to as a writing I/O request to request writing related data. Generally, when a RAID is created, the stripe number and stripe width of the RAID may be determined based on the predetermined capacity and other configuration of the RAID (such as the RAID level). The storage capacity of the RAID may be known by the user, and each stripe may be addressed by a corresponding address (such as an identifier). The user may write and/or read data to and/or from the RAID as needed. The data will be written in unit of stripes of the RAID. According to the user request, the layer 110, for example, the control module 130 of the layer 110, determines that data is requested to be written into the first stripe 113 of the RAID 112. Therefore, a write request for the first stripe 113 is sent to the layer 110 or to the control module 130 of the layer 120 to write the related data into the extents 121 of the disk 122.

At 320, the control module 130 searches for extents 121 mapped to the first stripe 113. The control module 130 maintains a mapping table between the stripes of the RAID and the extents of the disks. With the mapping table, the control module 130 may store the data requested to be written into the extents to which the stripe is mapped in response to the write request for that specific stripe, and read data from the extents to which the stripe is mapped in response to the read request for that specific stripe. As mentioned above, instead of allocating and mapping corresponding extents to all the stripes 113 of the RAID 112 upon creation of the RAID 112, in the embodiments of the present disclosure, on-demand extent allocation is adopted. After a RAID 112 is created, not all the stripes 113 of the RAID 112 are mapped to the corresponding extents 121, the mapping is created only between the stripes 113 for which data are requested to be written and the extents 121.

If the control module 130 finds that the extents mapped to the first stripe 113 are missed, it means that the first stripe 113 is not requested to be written with data previously. At 330, the control module 130 selects a set of extents 121 (referred to as a "first set of extents") in the free state 220 from the plurality of extents 121 of the plurality of disks 122. In some embodiments, the plurality of disks 122 include one or more spare disks (for example, the disk 122-4) and the currently available disks (such as the disks 122-1, 122-2, . . . , 122-3). The control module 130 selects the first set of extents 121 from the extents 121 of the currently available disks 122 only. The number of extents in the first set of selected extents 121 may be based on the stripe width of the RAID 112 which is related to the configuration (including the RAID level) for creating the RAID 112. For example, if the RAID 112 is created as RAID5, then the stripe width of the RAID 112 may include five extents, and the first set of extents 121 may include five extents.

The selection of the first set of extents 121 may follow some predetermined criteria for extent selection. For example, since the first set of extents 121 are to be mapped to the first stripe 113, any two extents in the first set of extents 121 are not located in the same disk 122. Additionally, or as an alternative, after the first set of extents 121 are selected, the number of the extents in each disk 122 to which the stripes 113 of RAID 112 have been mapped and the extents which are selected for mapping are substantially the same, thereby ensuring that the RAID 112 is evenly distributed across the plurality of disks 122. Thus, the first set of extents 121 may be selected from different disks 122.

In some embodiments, the control module 130 may select the first set of extents 121 additionally or alternatively based on the I/O load of the disks 122 and/or the wear degrees of the disks 122. For example, in the case of ensuring that two extents are not selected from the same disk 122 and the RAID 112 is evenly distributed across the plurality of disks 122, the control module 130 may select a larger number of extents 121 in the free state than the number of the first set of extents 121. In this case, the control module 130 may take the I/O load and/or the wear degrees of the disks 122 into account.

I/O load of a disk 122 indicates the frequency or times of data reading and/or writing in the extents of the disk 122. A wear degree of a disk 122 may indicate the service life of the disk 122. When the disk 122 is a solid state disk (DSS), due to the limited number of data erasure times in an SSD-type disk, the wear degree of the disk 122 is particularly helpful. If the number of remaining erasure times of the SSD-type disk 122 is small, it means that the wear degree of the disk 122 is high. When the first set of extents 121 are selected, the control module 130 may select free extents 121 on the disk(s) 122 with lower I/O load and/or a lower wear degree.

In other embodiments, in addition to the above extent selection criteria or as an alternative, the control module 130 may also utilize any other extent allocation criteria that can maintain the characteristics of the storage system 100 and improve the system performance. The embodiments of the present disclosure are not limited in this regard.

At 340, after the first set of extents are selected, the control module 130 may optionally change the state of the first extent to the reserved state 230. The reserved state 230 indicates that the first set of extents 121 are reserved for the first stripe 113 of the RAID 112 and thus are no longer "free." An extent 121 in the reserved state 230 will not be allocated to other RAIDs or stripes directly.

At 350, the control module 130 maps the first stripe 113 to the first set of extents 121. Specifically, the control module 130 may create a mapping between the first stripe 113 and the first set of extents 121, and add the mapping to the maintained mapping table. The mapping between the first stripe 113 and the first set of extents 121 may include the mapping between the identifier for locating the first stripe 113 and the identifier for locating each of the first set of extents 121.

In an example, the identifier of the first stripe 113 may be identified as (RAID_ID, RAID_Extent_ID, Offset), where RAID_ID represents the identifier of the RAID 112, RAID_Extent_ID represents the identifier of the first stripe 113 in the RAID 112, and Offset represents an offset of the first stripe 113 in RAID 112. The control module 130 may determine the identifier of the first stripe 113 from the received write request. The identifier of each extent 121 may be identified as (DISK_ID, DISK_Extent_Number), where DISK_ID represents the identifier of the disk 122 where the extent 112 is located, and DISK_Extent_Number represents the identifier of the extent 112 in the disk 122.

At 360, the control module 130 may optionally change the state of the first set of extents 121 to the consumed state 240. The consumed state 240 may indicate that the first set of extents 121 have been consumed by the RAID 112 and the corresponding mapping has been established correctly. At 370, the control module 130 may write the related data requested to be written by the write request to the first set of selected extents 121. Of course, if the control module 130 finds at 320 the extents 121 mapped to the first stripe 113, it may also write, at 370, the related data into the mapped extent 121 without allocating extents for the first stripe 113.

Figure 4:
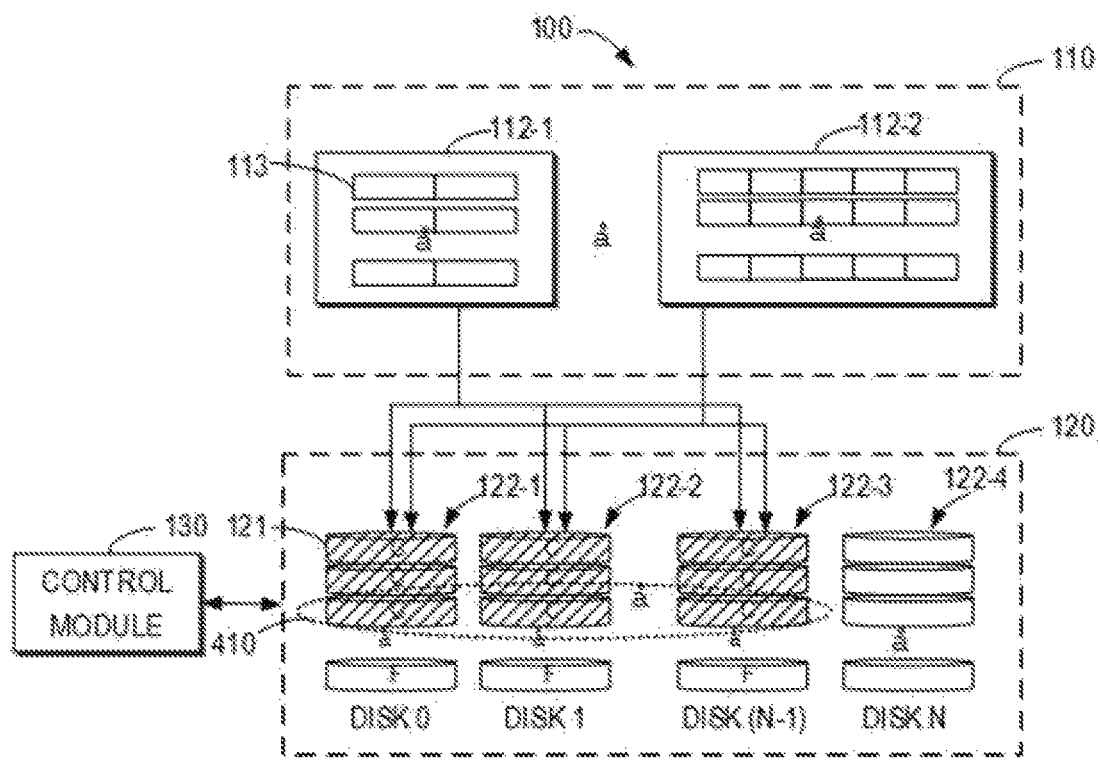
FIG. 4 illustrates a schematic diagram for allocating extents in accordance with an embodiment of the present disclosure.

FIG. 4 illustrates extent allocation of the storage system 100 in FIG. 1 after a write request. A certain stripe 113 of the RAID 112 is not mapped to the extents 121 previously. After the user initiates a write request for the stripe 113, through the process 300, a plurality of extents 121 of the disks 122 (indicated by 410) are selected and mapped to the stripe 113.

The selected extents 121 were in the free state 220, transitioned to the reserved state 230, and then to the consumed state 240 (represented by "C") after the mapping between the extent 121 and the first stripe 113 is established. The extents 121 having no mapping established with the stripe 113 of the RAID 112 are in the free state (represented by "F").

It would be understood that although various steps are shown in a particular order in FIG. 3, these steps are not necessarily to be implemented in the order as shown. In some embodiments, some of the steps of the process 300 may be implemented in parallel, or their order may be changed. For example, the data writing at 370 may be performed after the first set of extents are selected and may be implemented in parallel with the change of a certain state or the mapping between the stripes and extents. In some embodiments, some steps of the process 300 (such as the steps 340, 360 and 370) may be omitted.

As can be seen from the process 300, as the user continuously writes data to the stripes 113 of the RAID 112, more stripes 113 are allocated and mapped to the corresponding extents 121. Generally, when the RAID 112 is created, the capacity provided by the available disks 122 at the layer 120 may be ensured to meet the capacity requirement of the RAID 112 even if the extents 121 of the disks 122 are not specifically mapped to the stripes of the RAID 112. In this manner, there may be more free extents 121 at the layer 120 for flexible use. Moreover, for the extents 121 that are not mapped and in the free state, it is not necessary for the control module 130 to write invalid data (for example, all-zero values) to these extents to represent the consumption of the extents by the corresponding RAID as in the traditional solution, which reduces I/O access to the extents and thereby reduces the wear degrees of the disks or extents. This is particularly advantageous in the case of SSD disks.

Figure 5:
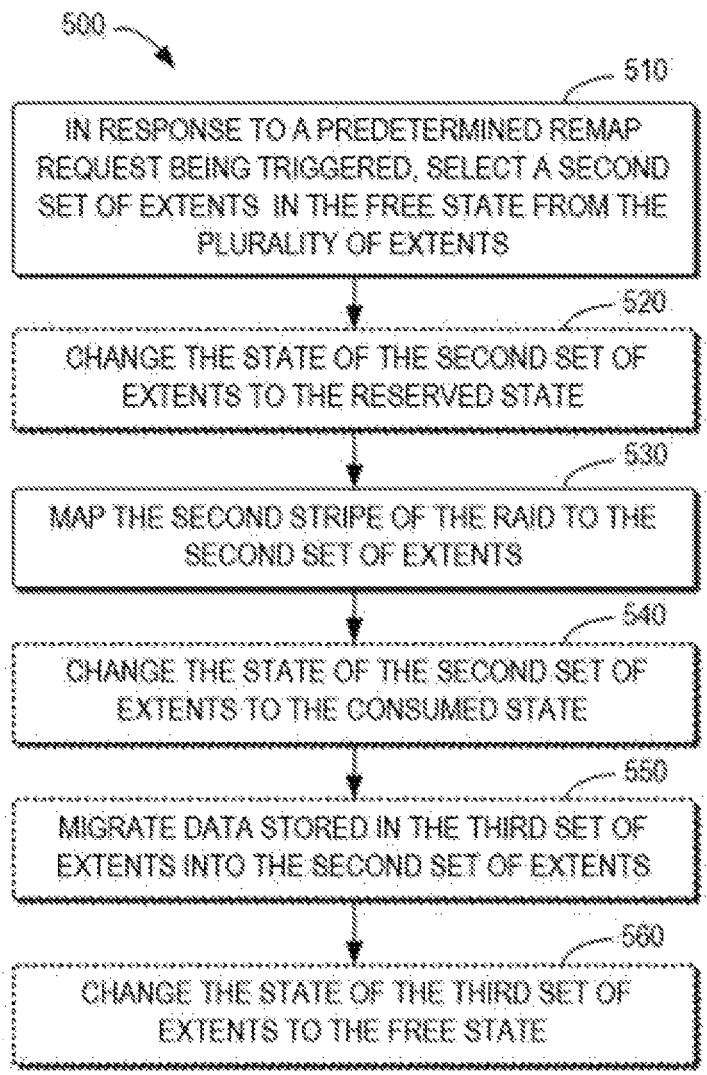
FIG. 5 illustrates is a flowchart of a process of managing a plurality of disks in accordance with another embodiment of the present disclosure.

In some embodiments, after a certain stripe 113 of a RAID 112 is mapped to the respective extents 121, due to the occurrence of some particular conditions during the operation process, the control module 130 may remap the certain stripe 113 to other extents 121 of the disk 122. FIG. 5 illustrates another process 500 of managing a plurality of disks in this way. The process 500 may also be implemented by the control module 130. For purpose of discussion, the process 500 will be described with reference to FIGS. 1 and 2.

At 510, in response to a predetermined remap request being triggered, the control module 130 selects a set of extents 121 (referred to as a "second set of extents") in the free state from the plurality of extents. The triggering by the remap request will cause the mapping between one or more stripes 113 (hereinafter referred to as a "second stripe") of the RAID 112 and the extents 121 to be changed, resulting in extent reallocation. The second set of extents 121 are selected to replace a set of extents 121 (referred to as a "third set of extents") to which the second stripe 113 of the RAID 112 is mapped previously. In the storage system 100, there may be many cases that can trigger the predetermined remap request.

In some embodiments, the condition where the predetermined remap request is triggered may include adding a new disk(s). Generally, when one or more new disks are added to the layer 120, since all the extents of new disks are in the free state and not allocated to any RAID, the distribution of the created RAIDs 112 among the plurality of disks (including the new disk) may not be even. Therefore, when a new disk(s) is detected to be added, the control module 130 may determine that the predetermined remap request is triggered. Then, the second set of extents to be selected by the control module 130 at 510 are free extents on the new disk.

This predetermined remap request triggers the remapping between the stripes 113 of a RAID 112 and the extents at the layer 120 so as to ensure that this RAID is distributed evenly among the current disks. Depending on the storage capacity requirement and the stripe width of the one or more RAIDs 112 created on the current disks, and the storage capacity per extent, the control module 130 may determine how many of the disks 122 (including the newly added disk) should be allocated to be mapped to the stripes 113 of the RAIDs 112. Based on the allocation result, the control module 130 may determine which extents on the existing disks 122 at the layer 120 may be demapped so that a stripe 113 (namely, a second stripe 113) corresponding to this portion of extents are mapped to the extents on the new disks. It would be appreciated that various technologies in the current storage system may be utilized to determine the extents and stripes to be reallocated during the process of extent reallocation (i.e., the shuffle process). The scope of the present disclosure is not limited in this regard.

Through the reallocation, the control module 130 may determine the second set of extents on the new disks to which one or more second stripes 113 of RAID 112 are to be mapped from the one or more extents 121 to which they are previously mapped. For each second stripe 113 to be remapped to, the control module 130 may determine a set of free extents on the new disks. In some embodiments, all or a part of the extents to which the second stripe 113 is previously mapped may be replaced with free extents on the new disks. Accordingly, the control module 130 may select a corresponding number of extents on the new disks as the second set of extents.

In some other embodiments, the condition where the predetermined remap request is triggered may include identifying an error disk. If the number of errors occurred in a certain disk (or corresponding extents) of the used disk 122 has reached a predetermined threshold, the control module 130 may identify this disk 122 as an EOL disk and start the corresponding process to select a spare disk at the layer 120 (such as the spare disk 122-4 of the storage system 100) to replace the EOL disk 122. The extents in the spare disk 122 may be initially configured in the free state. In this case, a stripe 113 (referred to as a second stripe) that is previously mapped to one or more extents of the EOL disk 122 may be remapped to the free extents 121 on the enabled spare disk 122. For each second stripe 113, the control module 130 selects a number of free extents 121 from the spare disk 122, the number of selected free extents corresponding to the extents on the EOL disk 122 to which this stripe is mapped.

In some embodiments, during the process of remapping, as discussed above with reference to FIG. 3, the control module 130 may also select the extents to be remapped based on the wear degrees and/or I/O load of the disks 122. For example, based on the wear degrees and/or I/O load of the disks 122, it is determined which extents are to be migrated to the free extents of the new disk.

At 520, the control module 130 may optionally change the state of the second set of extents 121 to the reserved state 230. The reserved state 230 indicates that the second set of extents 121 are reserved for the second stripe 113 of the RAID 112 and thus are no longer "free." The extents 121 in the reserved state 230 will not be allocated directly to other RAID or stripes.

At 530, the control module 130 maps the second stripe 113 of the RAID 112 to the second set of extents 121.

Specifically, the control module 130 may update the mapping associated with the second stripe 113 so as to replace the third set of extents 121 to which the second stripe 113 is previously mapped with the second set of extents 121 that are currently selected. As discussed above, depending on different triggering conditions of the remap request, the third set of extents 121 may be extents in the used disk 122 or extents in the disk 122 marked as EOL. Generally, the number of the third set of extents 121 is equal to that of the second set of extents 121. The number may be equal to or smaller than the stripe width of the second stripe 113. In other words, all or a part of the extents to which the second stripe 113 is previously mapped may be changed.

At 540, the control module 130 may optionally change the state of the second set of extents 121 to the consumed state 230. The consumed state 240 may indicate that the second set of extents 121 have been consumed by the RAID 112 and the corresponding mapping has been established correctly.

In addition to updating the mapping, the control module 130 may migrate, at 550, data stored in the third set of extents 121 to which the second stripe 113 is previously mapped into the second set of extents 121 to which the second stripe 113 is currently mapped. By means of the state identification and on-demand extent allocation, during the process of data migration triggered by the updating of the mapping, the control module 130 may migrate valid data only without migrating unnecessary invalid data. This is because the third set of extents 121 were previously mapped to the second stripe 113, indicating that the third set of extents 121 are in the consumed state 240 and store data written by the user.

When the data of the third set of extents 121 on the EOL disk 122 are migrated, since too many errors occur on this disk 122, one or more extents 121 in the third set of extents 121 may be marked as the error state 250, while the other extents 121 are marked as the consumed state 240. However, the third set of extents 121 in the error state 250 and the consumed state 240 all have valid data stored thereon. In this case, the control module 130 may also avoid migration of unnecessary invalid data.

At 560, the control module 130 may also optionally change the state of the third set of extents 121 to the free state 220. If the third set of extents 121 are extents in the consumed disk 122, its state is changed to the free state 220 so that these extents continue to be mapped into other stripes 113 as the RAID 112 is in use. In the case that the third set of extents 121 are located in the EOL disk 122, the state of these extents 121 is changed to the free state 220, which may facilitate subsequent processing of the EOL disk 122. For example, based on the free state 220, the control module 130 may determine that the mapping between the extents 121 of the EOL disk 122 and the stripes 113 of the RAIDs 112 has been updated so as to remove the EOL disk 122 from the layer 120.

In some embodiments, when the EOL disk 122 is replaced with the spare disk 122, it is expected that the spare disk 122 retains the state of the corresponding extents in the EOL disk 122, for example, in the transitional reserved state 230. The control module 130 may determine whether there are extents 121 in the reserved state 230 in the EOL disk 122. If the control module 130 determines that one or more extents 121 of the EOL disk 122 are in the reserved state, it may also configure the state of a corresponding number of extents 121 in the spare disk 122 to the reserved state 230 (for example, changing from the free state 220 to the reserved state 230). The stripe 113 to which the extents 121 in the reserved state 230 will be mapped may also be aware of by the control module 130. After the disk replacement is completed, the control module 130 may continue to create the mapping between the reserved extents 121 and the corresponding stripe 113 in the enabled spare disk.

Figure 6A:
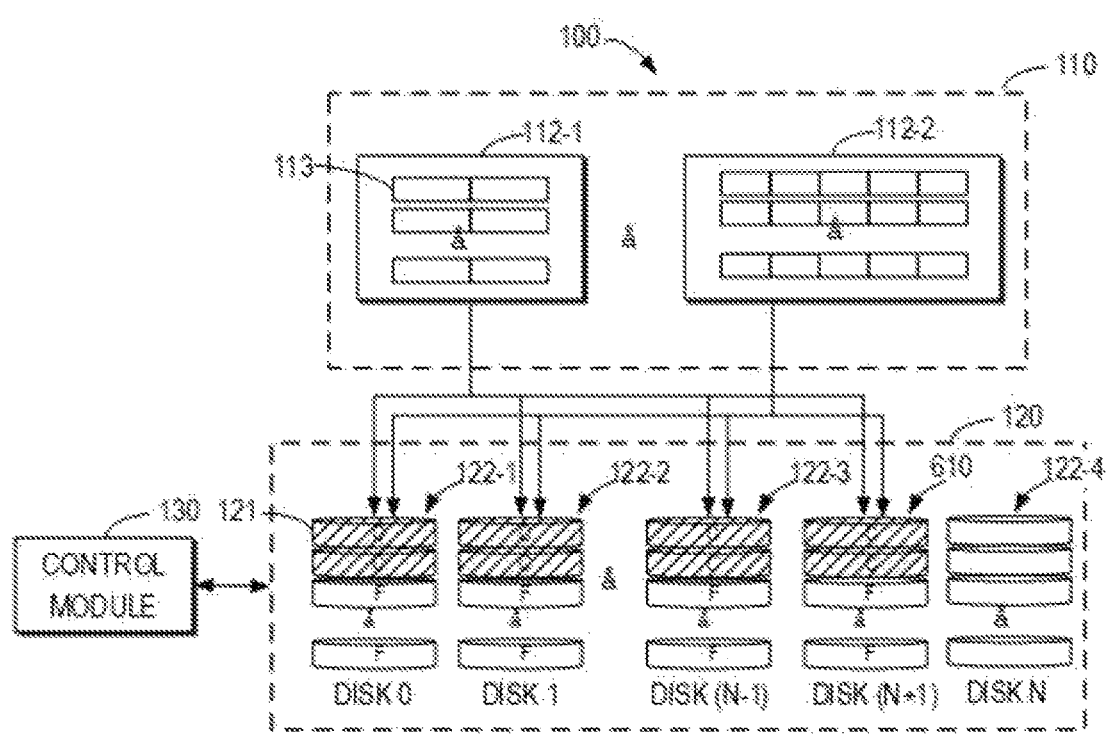
FIGS. 6A and 6B illustrate schematic diagrams for extent allocation in accordance with embodiments of the present disclosure.

FIG. 6A illustrates the change of the mapping state in the case that a new disk is added. After the extent allocation shown in FIG. 4, a new disk 610 (the disk (N+1)) is added to the layer 120, which also include a plurality of extents 121. The control module 130 reallocates the extents for RAIDs 112-1, 112-2 and so on through the process 500 so that these RAIDs 112 are substantially evenly allocated across the existing disks 122 and the new disk 610. As shown in FIG. 6A, some extents 121 of the new disk 610 are mapped to the stripes of the RAID 112 so that the usage of the extents of the plurality of disks 122 and the new disk 610 is substantially the same. The state of the mapped extents 121 are also changed to the consumed state 240 (represented by "C") while more extents of the existing disks 122 are changed to the free state 220 (represented by "F").

Figure 6B:
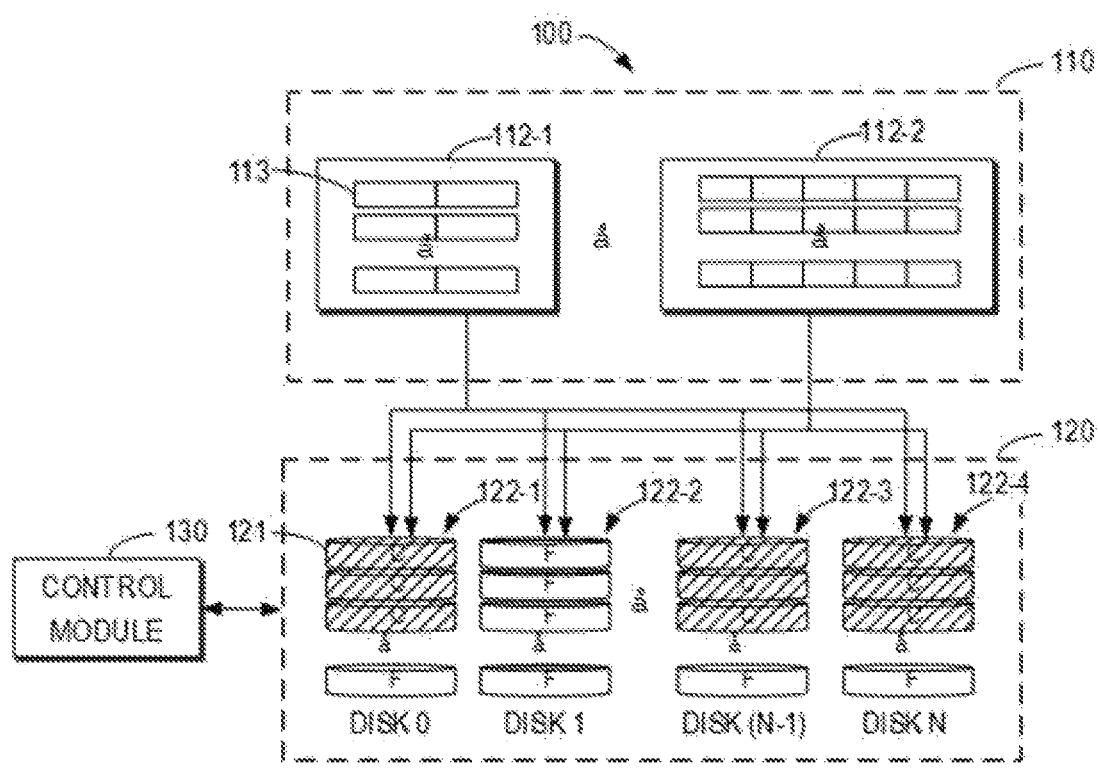

FIG. 6B illustrates the change of mapping state in the case that an error disk is replaced. After the extent allocation shown in FIG. 4, the number of errors occurred on the disk 122-2 exceeds a predetermined threshold. Therefore, the spare disk 122-4 is enabled to replace the error disk 122-2. The extents 121 of the disk 122-4 is initially configured to the free state 220 (represented by "F"), and the extents 121 in the consumed state on the disk 122-2 are migrated to the disk 122-4. As such, some extents 121 of the disk 122-4 are changed to the reserved state 230 and then to the consumed state 240 (represented by "C") after the mapping is established. The state of the extents 121 on the disk 122-2 is changed to the free state 220. The disk 122-2 may be later removed from the layer 120.

Based on the process 500, the control module 130 may implement the updating of extent mapping depending on different conditions occurred during the operation of the storage system 100. It would be appreciated that although various steps are illustrated in FIG. 5 in a particular order and are discussed above, these steps are not necessarily to be implemented in the order as shown. In some embodiments, some of the steps in the process 500 may be implemented in parallel, or the order may be changed. For example, the steps 540, 550 and 560 may be implemented in parallel. In some embodiments, some steps of the process 500 (such as the steps 520, 540, 550 and 560) may be omitted.

Through the on-demand extent allocation of the present disclosure, during the remapping process of the extents, the mapping may be completed more quickly. During the process of data migration triggered by the remapping of the extents, only valid data is needed to be migrated, which can reduce the data amount to be migrated and reduce the delay caused by the data migration as well as avoid unnecessary increase of the I/O access load. In addition, in the case where the user adds one or more new disks to the storage layer to expand the storage capacity of the storage layer and wants to create a new RAID accordingly, it is not necessary for the control module to wait for the completion of the process of extent reallocation but can directly utilize the available storage capacity (the new disk and free extents of the used disks) to create the new RAID.

Figure 7:
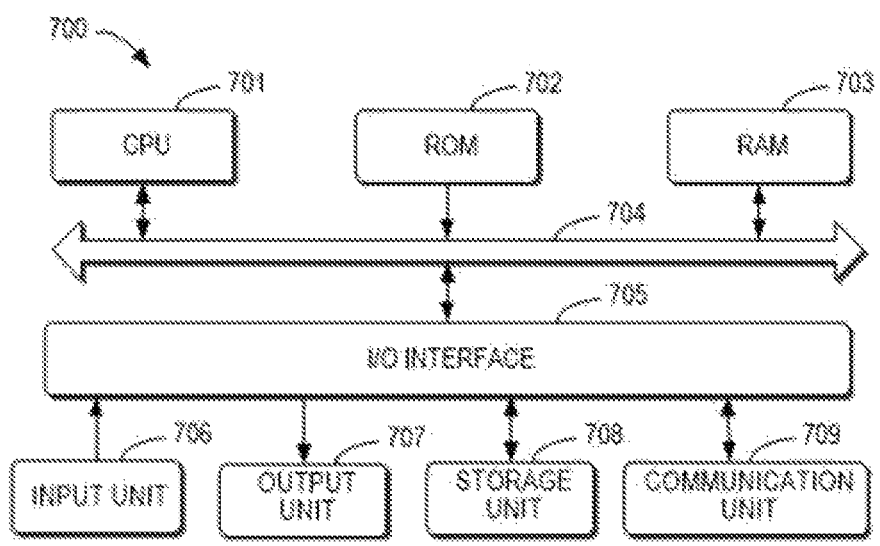
FIG. 7 illustrates a block diagram of an example device that can be used to implement embodiments of the present disclosure.

FIG. 7 illustrates a schematic block diagram of an example device 700 that can be used to implement the embodiments of the present disclosure. The device 700 can be provided for implementing the control module 130 or a part of the control module 130 in FIGS. 1, 4, 6A and 6B. As shown, the device 700 includes a central processing unit (CPU) 701 which can execute various suitable actions and processing based on computer program instructions stored in a read-only memory (ROM) 702 or loaded into a random access memory (RAM) 703 from a storage unit 708. The RAM 703 can also store various types of programs and data required by the operations of the device 700. CPU 701, ROM 702 and RAM 703 are connected to each other via a bus 704. The input/output (I/O) interface 705 is also connected to the bus 704.

A plurality of components in the device 700 are connected to the I/O interface 705, including an input unit 706 such as a keyboard, mouse and the like; an output unit 707 such as various types of displays, loudspeakers and the like; a storage unit 70, such as a magnetic disk, an optical disk and the like; and a communication unit 709 such as a network card, a modem, a wireless communication transceiver and the like. The communication unit 709 allows the device 700 to exchange information/data with other devices via the computer network such as Internet and/or various telecommunication networks.

The processing unit 701 performs various methods and processes as described above, such as the process 300 and/or the process 500. For example, in some embodiments, the process 300 and/or the process 500 can be implemented as computer software programs or computer program products, which are tangibly included in a machine-readable medium, such as the storage unit 708. In some embodiments, the computer program can be partially or fully loaded and/or installed to the device 700 via ROM 702 and/or the communication unit 709. When the computer program is loaded to RAM 703 and executed by CPU 701, one or more steps of the process 300 and/or the process 500 described above can be implemented. Alternatively, in the other embodiments, CPU 701 can be configured in any other suitable manners (e.g., by means of firmware) to implement the process 300 and/or process 500.

Those skilled in the art would understand that various steps of the method of the disclosure above may be implemented via a general purpose computing device, which may be integrated on a single computing device or distributed over a network consisting of a plurality of computing devices. Alternatively, they may be implemented with program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of managing a plurality of disks, comprising:
   in response to receiving a write request for a first stripe of a redundant array of independent disks (RAID), searching for extents mapped to the first stripe, the RAID being created on a plurality of extents that are located on the plurality of disks, wherein the disks are in a physical storage layer of a data storage system, and wherein the plurality of extents are obtained by dividing each disk in the plurality of disks into multiple, equal-size extents;
   in response to the first stripe of the RAID having not been requested to be written with data previously, selecting a first set of extents in a free state from the plurality of extents of the plurality of disks at least in part by selecting extents that are located on individual disks of the plurality of disks having both i) lower input/output (I/O) load, and ii) lower wear degrees, wherein the relatively lower wear degrees indicate relatively higher numbers of remaining erasures;
   mapping the first stripe to the first set of extents;
   in response to a predetermined remap request being triggered, selecting a second set of extents in the free state from the plurality of extents, wherein the second set of extents is made up of a total number of extents that is smaller than a stripe width of a second stripe;
   remapping the second stripe of the RAID to the second set of extents, the second stripe being previously mapped to a third set of extents of the plurality of extents; and
   changing the state of the second set of extents to a consumed state.

2. The method of claim 1, further comprising:
   in response to the first set of extents being selected, changing the state of the first set of extents to a reserved state.

3. The method of claim 1, further comprising:
   in response to the first stripe being mapped to the first set of extents, changing the state of the first set of extents to a consumed state.

4. The method of claim 1, further comprising:
   migrating data stored in the third set of extents into the second set of extents; and
   changing the state of the third set of extents to the free state.

5. The method of claim 1, further comprising:
   in response to a first disk of the plurality of disks being added for the RAID, triggering the predetermined remap request, extents obtained by dividing the first disk being in the free state; and
   wherein selecting the second set of extents from the plurality of extents comprises selecting the second set of extents from the extents of the first disk.

6. The method of claim 1, further comprising:
   in response to the number of errors occurred on a second disk of the plurality of disks reaching a predetermined threshold, triggering the predetermined remap request, the second disk comprising the third set of extents; and
   wherein selecting the second set of extents from the plurality of extents comprises selecting the second set of extents from extents of a third disk of the plurality of disks, the third disk being identified as a spare disk.

7. The method of claim 6, further comprising:
   in response to a predetermined number of extents in the second disk being in a reserved state, setting a state of the predetermined number of extents of the third disk as a reserved state.

8. The method of claim 1, further comprising:
wherein the first RAID stripe has a stripe width; and
wherein selecting the first set of extents in the free state from the plurality of extents of the plurality of disks comprises selecting a total number of extents in the first set of extents that is equal to the stripe width of the first stripe.

9. The method of claim 1, wherein mapping the first stripe to the first set of extents comprises adding a mapping of the first stripe to the first set of extents to a mapping table.

10. The method of claim 9, wherein adding the mapping of the first stripe to the first set of extents to the mapping table comprises adding a mapping between an identifier for locating the first stripe and an identifier for locating the first set of extents to the mapping table.

11. An apparatus for managing a plurality of disks, comprising:
a processor; and
a memory coupled to the processor, the memory having instructions stored therein which, when executed by the processor, cause the apparatus to perform acts comprising:
in response to receiving a write request for a first stripe of a redundant array of independent disks (RAID), searching for extents mapped to the first stripe, the RAID being created on a plurality of extents that are located on the plurality of disks, wherein the disks are in a physical storage layer of a data storage system, and wherein the plurality of extents are obtained by dividing each disk in the plurality of disks into multiple, equal-size extents;
in response to the first stripe of the RAID having not been requested to be written with data previously, selecting a first set of extents in a free state from the plurality of extents of the plurality of disks at least in part by selecting extents that are located on individual disks of the plurality of disks having both i) lower input/output (I/O) load, and ii) lower wear degrees, wherein the relatively lower wear degrees indicate relatively higher numbers of remaining erasures;
mapping the first stripe to the first set of extents,
in response to a predetermined remap request being triggered, selecting a second set of extents in the free state from the plurality of extents, wherein the second set of extents is made up of a total number of extents that is smaller than a stripe width of a second stripe;
remapping the second stripe of the RAID to the second set of extents, the second stripe being previously mapped to a third set of extents of the plurality of extents; and
changing the state of the second set of extents to a consumed state.

12. The apparatus of claim 11, wherein the acts further comprise:
in response to the first set of extents being selected, changing the state of the first set of extents to a reserved state.

13. The apparatus of claim 11, wherein the acts further comprise:
in response to the first stripe being mapped to the first set of extents, changing the state of the first set of extents to a consumed state.

14. The apparatus of claim 11, wherein the acts further comprise:
migrating data stored in the third set of extents into the second set of extents; and
changing the state of the third set of extents to the free state.

15. The apparatus of claim 11, wherein the acts further comprise:
in response to a first disk of the plurality of disks being added for the RAID, triggering the predetermined remap request, extents obtained by dividing the first disk being in the free state; and
wherein selecting the second set of extents from the plurality of extents comprises selecting the second set of extents from the extents of the first disk.

16. The apparatus of claim 11, wherein the acts further comprise:
in response to the number of errors occurred on a second disk of the plurality of disks reaching a predetermined threshold, triggering the predetermined remap request, the second disk comprising the third set of extents; and
wherein selecting the second set of extents from the plurality of extents comprises selecting the second set of extents from extents of a third disk of the plurality of disks, the third disk being identified as a spare disk.

17. The apparatus of claim 16, wherein the acts further comprise:
in response to a predetermined number of extents in the second disk being in a reserved state, setting a state of the predetermined number of extents of the third disk as a reserved state.

18. A computer program product for managing a plurality of disks, the computer program product comprising:
a non-transitory computer readable medium encoded with computer-executable code, the code configured to enable the execution of:
in response to receiving a write request for a first stripe of a redundant array of independent disks (RAID), searching for extents mapped to the first stripe, the RAID being created on a plurality of extents that are located on the plurality of disks, wherein the disks are in a physical storage layer of a data storage system, and wherein the plurality of extents are obtained by dividing each disk in the plurality of disks into multiple, equal-size extents;
in response to the first stripe of the RAID having not been requested to be written with data previously, selecting a first set of extents in a free state from the plurality of extents of the plurality of disks at least in part by selecting extents that are located on individual disks of the plurality of disks having both i) lower input/output (I/O) load, and ii) lower wear degrees, wherein the relatively lower wear degrees indicate relatively higher numbers of remaining erasures;
mapping the first stripe to the first set of extents;
in response to a predetermined remap request being triggered, selecting a second set of extents in the free state from the plurality of extents, wherein the second set of extents is made up of a total number of extents that is smaller than a stripe width of a second stripe;
remapping the second stripe of the RAID to the second set of extents, the second stripe being previously mapped to a third set of extents of the plurality of extents; and
changing the state of the second set of extents to a consumed state.

19. The computer program product of claim 18, wherein the code is further configured to enable the execution of:
in response to the first set of extents being selected, changing the state of the first set of extents to a reserved state.

* * * * *